United States Patent
Warfield

(10) Patent No.: US 9,361,141 B2
(45) Date of Patent: Jun. 7, 2016

(54) SYSTEMS AND METHODS FOR CONTROLLING, BY A HYPERVISOR, ACCESS TO PHYSICAL RESOURCES

(71) Applicant: Citrix Systems, Inc., Fort Lauderdale, FL (US)

(72) Inventor: Andrew Kent Warfield, Vancover (CA)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

(21) Appl. No.: 14/035,386

(22) Filed: Sep. 24, 2013

(65) Prior Publication Data

US 2014/0026134 A1    Jan. 23, 2014

Related U.S. Application Data

(63) Continuation of application No. 12/342,796, filed on Dec. 23, 2008, now Pat. No. 8,549,516.

(51) Int. Cl.
*G06F 9/455* (2006.01)
*G06F 9/50* (2006.01)
*G06F 3/06* (2006.01)

(52) U.S. Cl.
CPC .......... *G06F 9/45533* (2013.01); *G06F 9/5077* (2013.01); *G06F 3/0614* (2013.01); *G06F 3/0664* (2013.01); *G06F 3/0676* (2013.01)

(58) Field of Classification Search
CPC . G06F 9/5077; G06F 9/5083; G06F 9/45533; G06F 3/0664
USPC .......................................................... 718/1
See application file for complete search history.

(56) References Cited

U.S. PATENT DOCUMENTS

| | | | |
|---|---|---|---|
| 7,299,468 B2 | 11/2007 | Casey et al. | |
| 7,421,533 B2 | 9/2008 | Zimmer et al. | |
| 7,620,955 B1 | 11/2009 | Nelson | |
| 7,801,994 B2 | 9/2010 | Kudo | |
| 7,886,183 B2* | 2/2011 | Krishnan et al. | 714/5.11 |
| 7,941,657 B2* | 5/2011 | Cromer et al. | 713/2 |
| 8,195,866 B2* | 6/2012 | Ginzton | G06F 9/45533 709/230 |
| 2004/0221290 A1 | 11/2004 | Casey et al. | |
| 2008/0028076 A1 | 1/2008 | Gupta et al. | |

(Continued)

FOREIGN PATENT DOCUMENTS

| | | |
|---|---|---|
| CN | 101115246 | 1/2008 |
| GB | 2 419 701 | 5/2006 |

OTHER PUBLICATIONS

Kang and Reddy; "An Approach to Virtual Allocation in Storage Systems"; 2006; ACM.*

(Continued)

*Primary Examiner* — Benjamin Geib
(74) *Attorney, Agent, or Firm* — Foley & Lardner LLP; John D. Lanza

(57) ABSTRACT

A system for controlling, by a hypervisor, access to physical resources during execution of a virtual machine includes a physical disk and a hypervisor. The physical disk is provided by a computing device and stores at least a portion of a virtual disk. The hypervisor executes on the computing device. The hypervisor allocates, to the virtual disk, an amount of access to the physical disk. The hypervisor determines that a level of utilization of the physical disk has exceeded a threshold. The hypervisor limits, in response to the determination, access by the virtual disk to the physical disk.

18 Claims, 5 Drawing Sheets

(56) References Cited

U.S. PATENT DOCUMENTS

| | | | |
|---|---|---|---|
| 2008/0127348 A1 | 5/2008 | Largman et al. | |
| 2008/0155153 A1 | 6/2008 | Yoshii et al. | |
| 2008/0244229 A1 | 10/2008 | Yao et al. | |
| 2009/0307457 A1 | 12/2009 | Pafumi et al. | |
| 2009/0320010 A1 | 12/2009 | Chow et al. | |
| 2010/0005464 A1 | 1/2010 | Malyugin et al. | |
| 2010/0030998 A1 | 2/2010 | Kiriansky | |
| 2010/0037089 A1 | 2/2010 | Krishnan et al. | |
| 2010/0077128 A1 | 3/2010 | Stansell et al. | |
| 2010/0121975 A1 | 5/2010 | Sinha et al. | |
| 2010/0262650 A1 | 10/2010 | Chauhan et al. | |

OTHER PUBLICATIONS

"Virtual Machine Security Guidelines Version 1.0" The Center for Internet Security, [Online] Sep. 2007, pp. 1-30, XP002571528.
Chinese Office Action on 200980151636.3 dated Apr. 1, 2013.
European Communication on 09796874.7 dated Jul. 11, 2011.
International Report on Patentability on PCT/US2009/066065 dated Jul. 7, 2011.
International Search Report for PCT/US2009/066065 dated Mar. 16, 2010.
L. Huang et al.,"Multi-dimensional storage virtualization" ACM Sigmetrics, vol. 32, No. 1, Jun. 2004, pp. 14-24, XP002571527.
Notice of Allowance on U.S. Appl. No. 12/342,796 dated May 23, 2013.
Office Action on U.S. Appl. No. 12/342,796 dated Oct. 18, 2012.
Office Action on U.S. Appl. No. 12/342,796 dated Dec. 6, 2011.
Office Action on U.S. Appl. No. 12/342,796 dated Apr. 26, 2012.
Singh A., et al. "Server-storage virtualization: Integration and load balancing in data centers" High Performance Computing, Networking, Storage and Analysis, 2008. SC 2008. International Conference for, IEEE, Piscataway, NJ, USA, Nov. 15, 2008, pp. 1-12, XP031519206 ISBN: 978-1-4244-2834-2.
Written Opinion for PCT/US2009/066065 dated Jun. 23, 2011.

* cited by examiner

SYSTEMS AND METHODS FOR CONTROLLING, BY A HYPERVISOR, ACCESS TO PHYSICAL RESOURCES

RELATED APPLICATIONS

The present application claims priority to U.S. patent application Ser. No. 12/342,796, "Systems and Methods for Controlling by a Hypervisor Access to Physical Resources," which will issue as U.S. Pat. No. 8,549,516 on Oct. 1, 2013, which is incorporated herein by reference.

FIELD OF THE DISCLOSURE

This disclosure generally relates to systems and methods for controlling access to resources. In particular, this disclosure relates to systems and methods for controlling, by a hypervisor, access to physical resources by virtual resources.

BACKGROUND OF THE DISCLOSURE

In conventional computing environments implementing a hypervisor to execute a virtual machine on a host computing device, the hypervisor typically provides the virtual machine with access to hardware resources provided by the host computing device. In such an environment, a conventional hypervisor does not typically provide functionality for preventing errors that result from overuse of an allocated resource from impacting a user of a virtual machine. For example, if a resource uses more than its allocated processor time or allocated disk access, the resource may create conflicts with other resources or cause an ungraceful termination of the virtual machine or of other virtual machines sharing access to the physical disk. Conventional hypervisors may receive an indication that an error or conflict has occurred after the fact, or determine, prior to execution of a virtual machine, that an error or conflict may occur. However, conventional hypervisors do not typically provide flexible options for continuing execution of a virtual machine after the occurrence of such errors.

BRIEF SUMMARY OF THE DISCLOSURE

In one aspect, a method for controlling, by a hypervisor, access to physical resources during execution of a virtual machine includes allocating, by a hypervisor, to a virtual disk in a virtual machine, an amount of access to at least one physical disk. The method includes determining, by the hypervisor, that a level of utilization of the physical disk exceeds a threshold. The method includes limiting, by the hypervisor in response to the determination, access by the virtual disk to the physical disk.

In one embodiment, the method includes rate-limiting the Input/Output (I/O) operations requested by the virtual disk. In another embodiment, the method includes suspending an execution of at least one process by the virtual machine. In still another embodiment, the method includes determining, by the hypervisor, that a capacity limit of the at least one physical disk has been reached. In yet another embodiment, the method includes masking, from the virtual machine, a physical disk error.

In another aspect, a system for controlling, by a hypervisor, access to physical resources during execution of a virtual machine includes a physical disk and a hypervisor. The physical disk is provided by a computing device and stores at least a portion of a virtual disk in a virtual machine. The hypervisor executes on the computing device. The hypervisor allocates, to the virtual disk, an amount of access to the physical disk. The hypervisor determines that a level of utilization of the physical disk, by a guest operating system executing within the virtual machine, exceeds a threshold within the allocated amount. The hypervisor limits, in response to the determination, access by the virtual disk to the physical disk.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
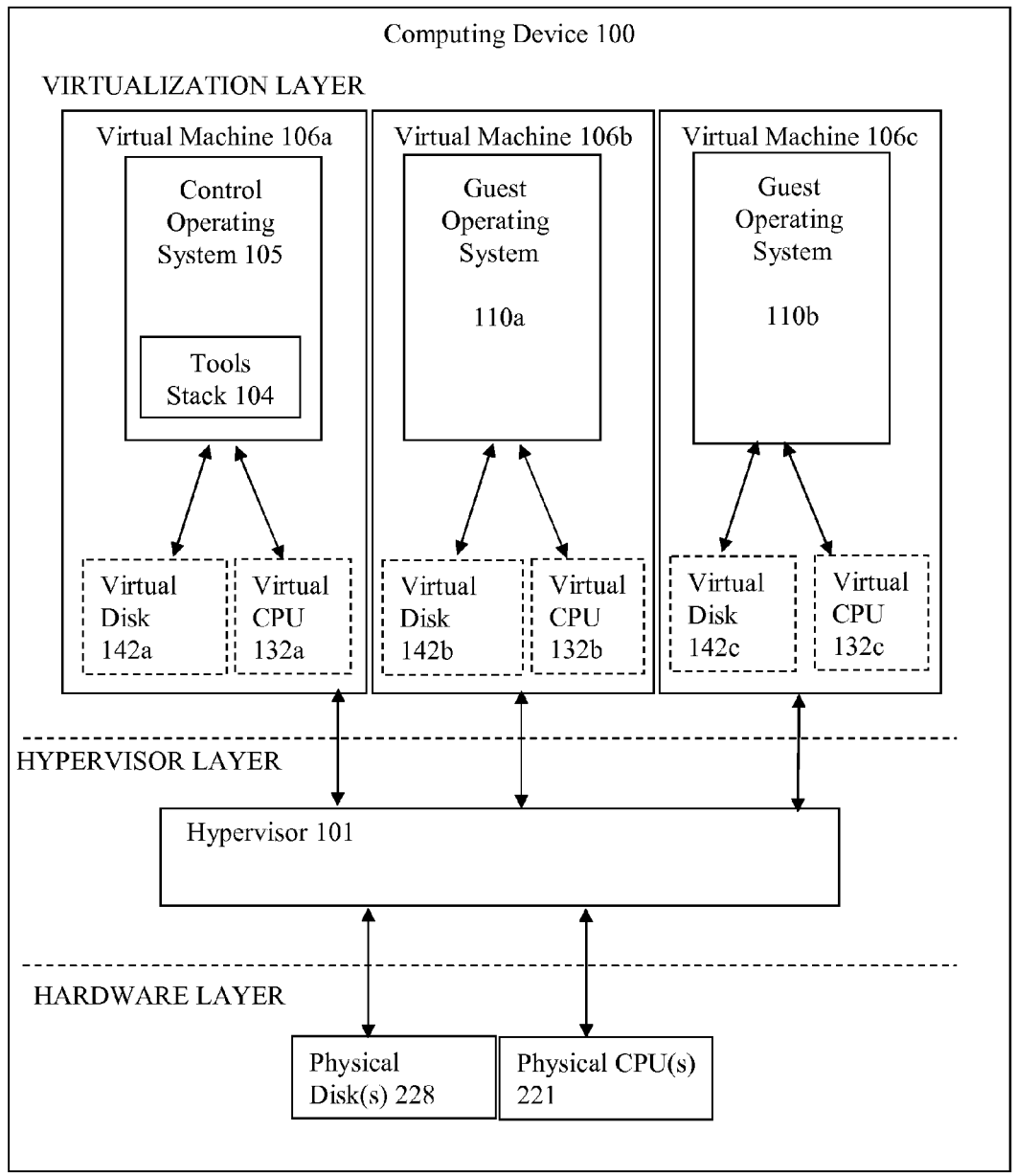
FIG. 1A is a block diagram depicting an embodiment of a computing environment comprising a hypervisor layer, a virtualization layer, and a hardware layer.

Referring now to FIG. 1A, a block diagram depicts one embodiment of a virtualization environment. In brief overview, a computing device 100 includes a hypervisor layer, a virtualization layer, and a hardware layer. The hypervisor layer includes a hypervisor 101 (also referred to as a virtualization manager) that allocates and manages access to a number of physical resources in the hardware layer (e.g., the processor(s) 221, and disk(s) 228) by at least one virtual machine executing in the virtualization layer. The virtualization layer includes at least one operating system 110 and a plurality of virtual resources allocated to the at least one operating system 110. Virtual resources may include, without limitation, a plurality of virtual processors 132a, 132b, 132c (generally 132), and virtual disks 142a, 142b, 142c (generally 142), as well as virtual resources such as virtual memory and virtual network interfaces. The plurality of virtual resources and the operating system 110 may be referred to as a virtual machine 106. A virtual machine 106 may include a control operating system 105 in communication with the hypervisor 101 and used to execute applications for managing and configuring other virtual machines on the computing device 100.

Referring now to FIG. 1A, and in greater detail, a hypervisor 101 may provide virtual resources to an operating system in any manner which simulates the operating system having access to a physical device. A hypervisor 101 may provide virtual resources to any number of guest operating systems 110a, 110b (generally 110). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor which creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 101 executes within an operating system executing on a computing device. In one of these embodiments, a computing device executing an operating system and a hypervisor 101 may be said to have a host operating system (the operating system executing on the computing device), and a guest operating system (an operating system executing within a computing resource partition provided by the hypervisor 101). In other embodiments, a hypervisor 101 interacts directly with hardware on a computing device, instead of executing on a host operating system. In one of these embodiments, the hypervisor 101 may be said to be executing on "bare metal," referring to the hardware comprising the computing device.

In some embodiments, a hypervisor 101 may create a virtual machine 106*a-c* (generally 106) in which an operating system 110 executes. In one of these embodiments, for example, the hypervisor 101 loads a virtual machine image to create a virtual machine 106. In another of these embodiments, the hypervisor 101 executes an operating system 110 within the virtual machine 106. In still another of these embodiments, the virtual machine 106 executes an operating system 110.

In some embodiments, the hypervisor 101 controls processor scheduling and memory partitioning for a virtual machine 106 executing on the computing device 100. In one of these embodiments, the hypervisor 101 controls the execution of at least one virtual machine 106. In another of these embodiments, the hypervisor 101 presents at least one virtual machine 106 with an abstraction of at least one hardware resource provided by the computing device 100. In other embodiments, the hypervisor 101 controls whether and how physical processor capabilities are presented to the virtual machine 106.

A control operating system 105 may execute at least one application for managing and configuring the guest operating systems. In one embodiment, the control operating system 105 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 101 executes the control operating system 105 within a virtual machine 106 created by the hypervisor 101. In still another embodiment, the control operating system 105 executes in a virtual machine 106 that is authorized to directly access physical resources on the computing device 100. In some embodiments, a control operating system 105*a* on a computing device 100*a* may exchange data with a control operating system 105*b* on a computing device 100*b*, via communications between a hypervisor 101*a* and a hypervisor 101*b*. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 105 executes in a virtual machine 106 that is authorized to interact with at least one guest operating system 110. In another embodiment, a guest operating system 110 communicates with the control operating system 105 via the hypervisor 101 in order to request access to a disk or a network. In still another embodiment, the guest operating system 110 and the control operating system 105 may communicate via a communication channel established by the hypervisor 101, such as, for example, via a plurality of shared memory pages made available by the hypervisor 101.

In some embodiments, the control operating system 105 includes a network back-end driver for communicating directly with networking hardware provided by the computing device 100. In one of these embodiments, the network back-end driver processes at least one virtual machine request from at least one guest operating system 110. In other embodiments, the control operating system 105 includes a block back-end driver for communicating with a storage element on the computing device 100. In one of these embodiments, the block back-end driver reads and writes data from the storage element based upon at least one request received from a guest operating system 110.

In one embodiment, the control operating system 105 includes a tools stack 104. In another embodiment, a tools stack 104 provides functionality for interacting with the hypervisor 101, communicating with other control operating systems 105 (for example, on a second computing device 100*b*), or managing virtual machines 106*b*, 106*c* on the computing device 100. In another embodiment, the tools stack 104 includes customized applications for providing improved management functionality to an administrator of a virtual machine farm. In some embodiments, at least one of the tools stack 104 and the control operating system 105 include a management API that provides an interface for remotely configuring and controlling virtual machines 106 running on a computing device 100. In other embodiments, the control operating system 105 communicates with the hypervisor 101 through the tools stack 104.

In one embodiment, the hypervisor 101 executes a guest operating system 110 within a virtual machine 106 created by the hypervisor 101. In another embodiment, the guest operating system 110 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 110, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 101; in such an embodiment, the driver is typically aware that it executes within a virtualized environment.

Figure 1B:
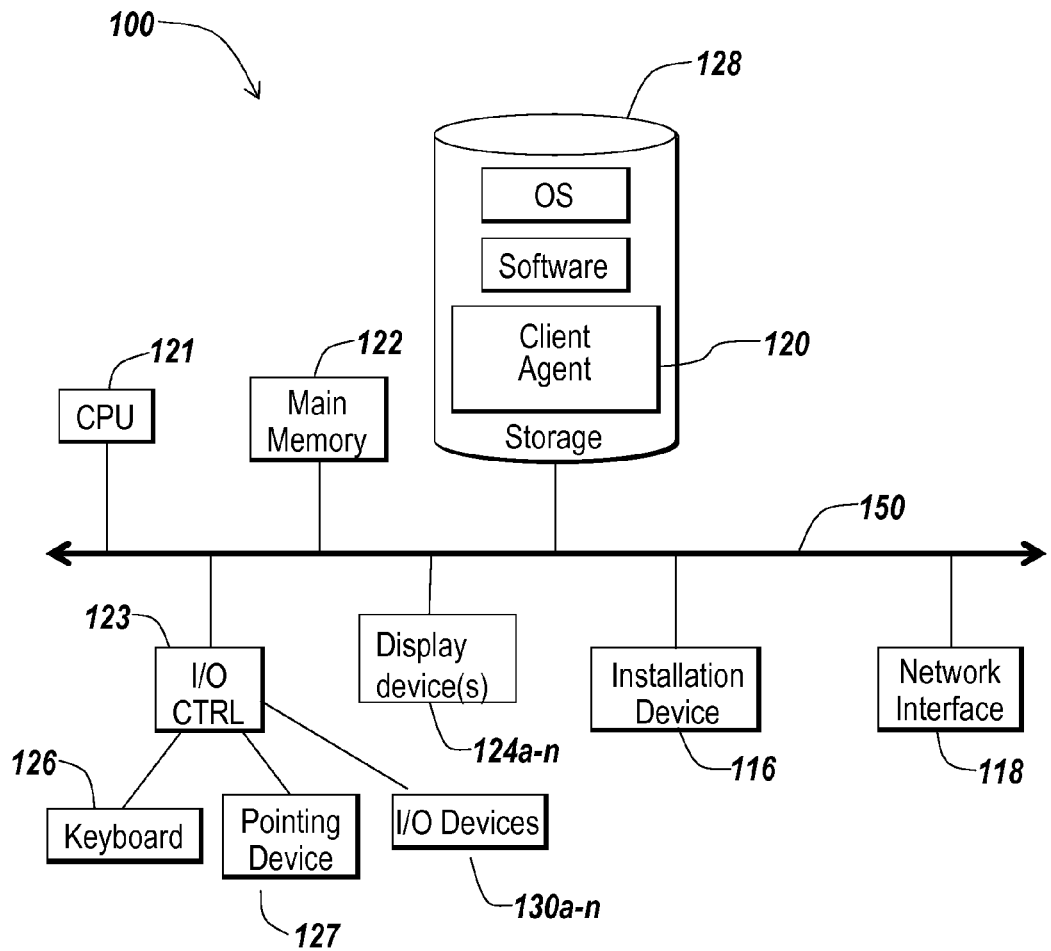
FIGS. 1B and 1C are block diagrams depicting embodiments of computing devices useful in connection with the methods and systems described herein.
Figure 1C:
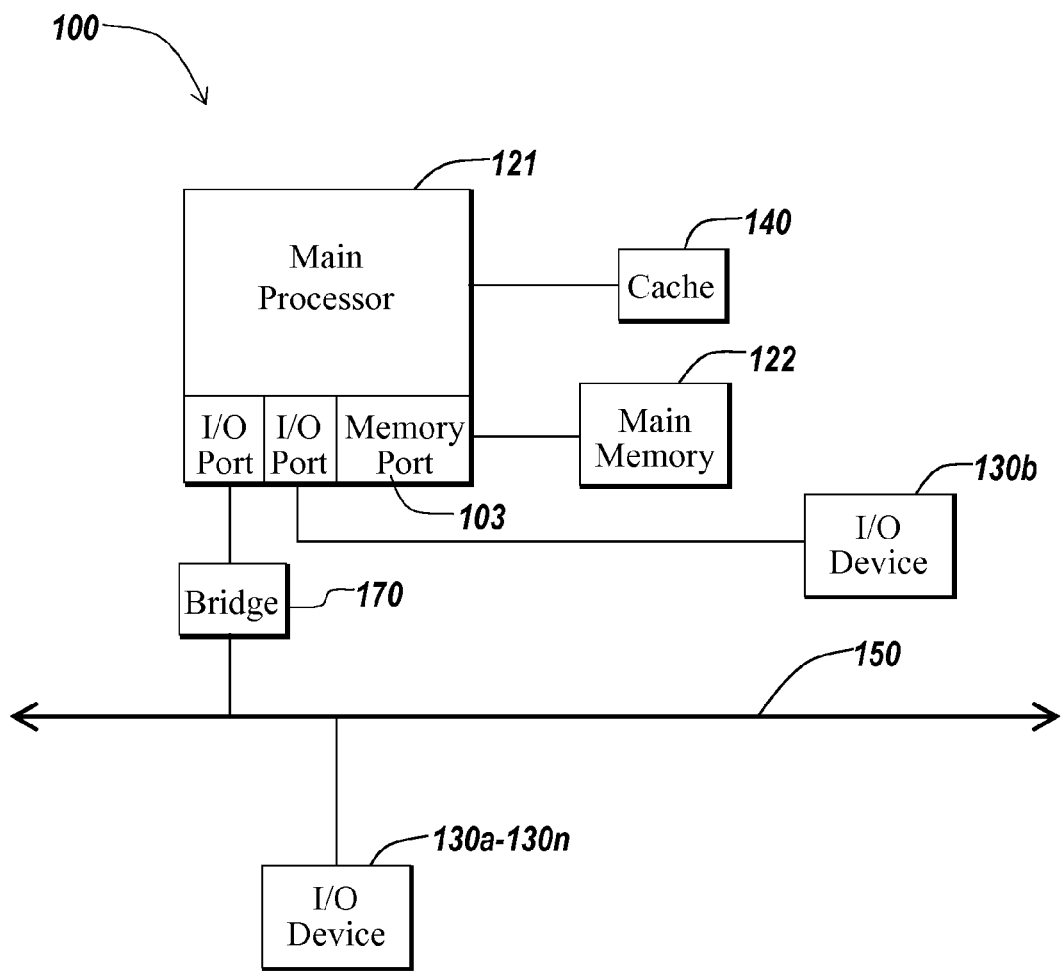

In another embodiment, the guest operating system 110, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 105, as described above The computing device 100 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of methods and systems described herein. As shown in FIGS. 1B and 1C, a computing device 100 includes a central processing unit 121, and a main memory unit 122. As shown in FIG. 1B, a computing device 100 may include a storage device 128, an installation device 116, a network interface 118, an I/O controller 123, display devices 124a-124n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In some embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output DRAM (EDO DRAM), Burst Extended Data Output DRAM (BEDO DRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with a display device 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc., of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS MOBILE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, Pro smart phone manufactured by Palm, Inc. In some of these embodiments, the TREO smart phone is operated under the control of the PalmOS operating system and includes a stylus input device as well as a five-way navigator device.

In other embodiments, the computing device 100 is a mobile device, such as a JAVA-enabled cellular telephone or personal digital assistant (PDA), such as the i55sr, i58sr, i85s, i88s, i90c, i95cl, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the ZEN VISION W, the ZEN VISION series, the ZEN PORTABLE MEDIA CENTER devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 includes a combination of devices, such as a mobile phone combined with a digital audio player or portable media player. In one of these embodiments, the computing device 100 is a smartphone, for example, an iPhone manufactured by Apple Computer, or a Blackberry device, manufactured by Research In Motion Limited. In yet another embodiment, the computing device 100 is a laptop or desktop computer equipped with a web browser and a microphone and speaker system, such as a telephony headset. In these embodiments, the computing devices 100 are web-enabled and can receive and initiate phone calls. In other embodiments, the communications device 100 is a Motorola RAZR or Motorola ROKR line of combination digital audio players and mobile phones.

A computing device 100 may be a file server, application server, web server, proxy server, appliance, network appliance, gateway, application gateway, gateway server, virtualization server, deployment server, SSL VPN server, or firewall. In some embodiments, a computing device 100 provides a remote authentication dial-in user service, and is referred to as a RADIUS server. In other embodiments, a computing device 100 may have the capacity to function as either an application server or as a master application server. In still other embodiments, a computing device 100 is a blade server.

In one embodiment, a computing device 100 may include an Active Directory. The computing device 100 may be an application acceleration appliance. For embodiments in which the computing device 100 is an application acceleration appliance, the computing device 100 may provide functionality including firewall functionality, application firewall functionality, or load balancing functionality. In some embodiments, the computing device 100 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In other embodiments, a computing device 100 may be referred to as a client node, a client machine, an endpoint node, or an endpoint. In some embodiments, a client 100 has the capacity to function as both a client node seeking access to resources provided by a server and as a server node providing access to hosted resources for other clients.

In some embodiments, a first, client computing device 100*a* communicates with a second, server computing device 100*b*. In one embodiment, the client communicates with one of the computing devices 100 in a server farm. Over the network, the client can, for example, request execution of various applications hosted by the computing devices 100 in the server farm and receive output data of the results of the application execution for display. In one embodiment, the client executes a program neighborhood application to communicate with a computing device 100 in a server farm.

A computing device 100 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on the computing device 100. In some embodiments, the application may be a server-based or a remote-based application executed on behalf of a user of a first computing device by a second computing device. In other embodiments, the second computing device may display output data to the first, client computing device using any thin-client or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

In some embodiments, a first computing device 100*a* executes an application on behalf of a user of a client computing device 100*b*. In other embodiments, a computing device 100*a* executes a virtual machine, which provides an execution session within which applications execute on behalf of a user or a client computing devices 100*b*. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

Figure 2:
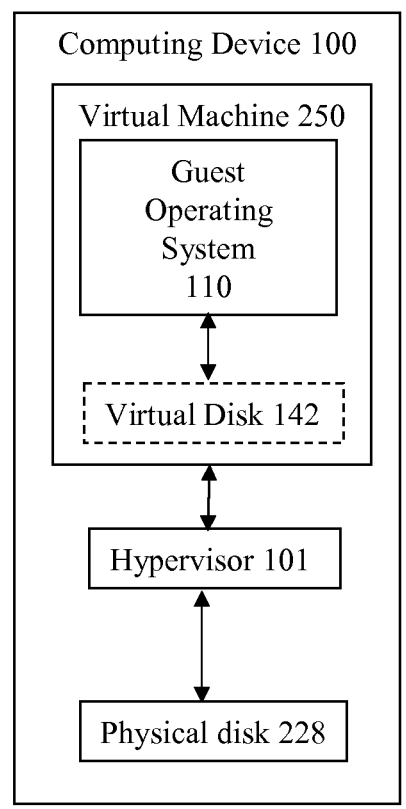
FIG. 2 is a block diagram depicting an embodiment of a system for controlling access to physical resources by a hypervisor.

Referring now to FIG. 2, a block diagram depicts one embodiment of a system for controlling access to physical resources by a hypervisor. In brief overview, the system includes a virtual machine 250, a hypervisor 101, and a physical disk 228. The hypervisor 101 executes on a computing device 100, which also provides the physical disk 228. The virtual machine 250 includes a guest operating system 110 and a virtual disk 142. The physical disk 228 stores at least a portion of the virtual disk 142. The hypervisor 101 executes on the computing device 100; for example, the hypervisor may execute on a physical CPU 221 described above in connection with FIGS. 1A-1C. The hypervisor 101 allocates to the virtual disk 142 access to the physical disk 228. The hypervisor 101 determines that a level of utilization of the physical disk 228 exceeds a threshold. The hypervisor 101 limits, in response to the determination, access by the virtual disk 142 to the physical disk 228.

Referring now to FIG. 2, and in greater detail, a physical disk 228 is provided by a computing device 100 and stores at least a portion of a virtual disk 142. In some embodiments, a virtual disk 142 is associated with a plurality of physical disks 228. In one of these embodiments, and as described above in connection with FIGS. 1A-C, one or more computing devices 100 may exchange data with one or more of the other computing devices 100 regarding processors and other physical resources available in a pool of resources, allowing a hypervisor to manage a pool of resources distributed across a plurality of physical computing devices. In such an embodiment, a hypervisor 101 may allocate to the virtual disk 142 access to a plurality of physical disks 228 provided by each of a plurality of computing devices 100.

The hypervisor executes on a processor on the computing device 100. The hypervisor allocates, to a virtual disk, an amount of access to the physical disk. In one embodiment, the hypervisor 101 allocates an amount of space on the physical disk. In another embodiment, the hypervisor 101 allocates a plurality of pages on the physical disk. In some embodiments, the hypervisor 101 provisions the virtual disk 142 as part of a process of initializing and executing a virtual machine 250.

In one embodiment, the hypervisor 101 includes functionality for determining that a level of utilization of the physical disk 228 exceeds a threshold and for limiting, in response to the determination, access by the virtual disk 142 to the physical disk 228. In some embodiments, the hypervisor 101 may include functionality for intercepting calls from the virtual disk 142 to the physical disk 228 along a virtualized input/output (I/O) path. In one of these embodiments, the hypervisor 101 includes interception and translation functionality allowing the hypervisor 101 to intercept an access request from a virtual disk 142 for access to the physical disk 228 (for example, intercepting a request to read or write to the physical disk 228) and to translate an address included in the request from the virtual disk 142 into a format the physical disk 228 is capable of processing. In another of these embodiments, the interception and translation functionality is modified to include functionality allowing the hypervisor to determine that a level of utilization of the physical disk 228 exceeds a threshold. In still another of these embodiments, the hypervisor 101 includes a component receiving an error message from the physical disk 228 and determining from the error that a level of utilization of the physical disk 228 exceeds a threshold. In yet another of these embodiments, the hypervisor 101 includes functionality for limiting, in response to the determination, access by the virtual disk 142 to the physical disk 228. In some embodiments, the interception and translation functionality is referred to as a block tap module.

In one embodiment, a module within the hypervisor 101 receives an error message indicating that a level of utilization of the physical disk 228 has exceeded a threshold. In another embodiment, the module within the hypervisor 101 determines whether and how to limit the access by the virtual disk 142 to the physical disk 228. In still another embodiment, the module modifies a configuration of the virtual disk 142 to limit the access. In still even another embodiment, the module within the hypervisor 101 transmits an identification of a limitation to impose on the virtual disk 142 to a second module within the hypervisor 101. In yet another embodiment, the module within the hypervisor 101 is a block tap module.

In one embodiment, a module within the control operating system 105 receives, from the hypervisor 101, an error message indicating that a level of utilization of the physical disk 228 has exceeded a threshold. In another embodiment, the module within the control operating system 105 determines whether and how to limit the access by the virtual disk 142 to the physical disk 228. In still another embodiment, the module within the control operating system 105 modifies a configuration of the virtual disk 142 to limit the access. In yet another embodiment, the module within the control operating system 105 transmits an identification of a limitation to impose on the virtual disk 142 to the hypervisor 101.

Figure 3:
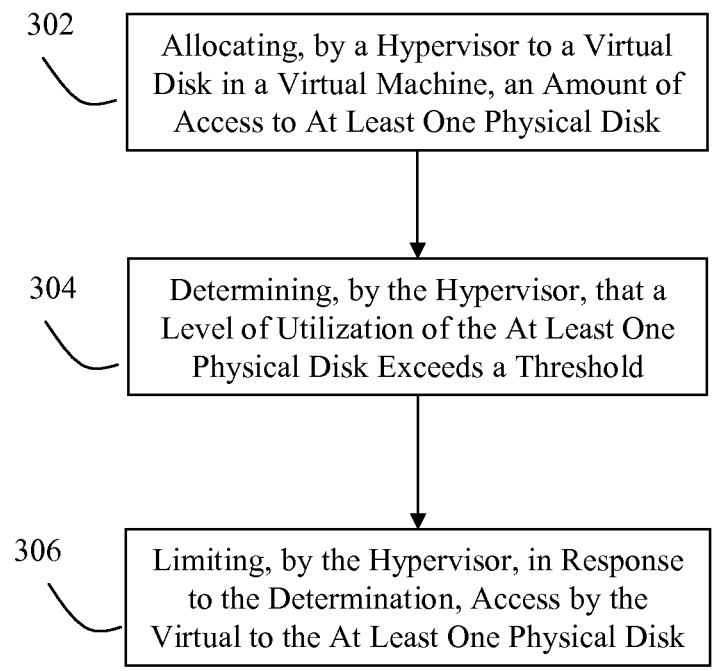
FIG. 3 is a flow diagram depicting an embodiment of a method for controlling access to physical resources by a hypervisor.

Referring now to FIG. 3, a flow diagram depicts one embodiment of a method for controlling access to physical resources by a hypervisor. In brief overview, the method includes allocating, by a hypervisor, to a virtual disk in a virtual machine, an amount of access to at least one physical disk (302). The method includes determining, by the hypervisor, that a level of utilization of the at least one physical disk exceeds a threshold (304). The method includes limiting, by the hypervisor in response to the determination, access by the virtual disk to the physical disk (306).

Referring now to FIG. 3, and in greater detail, a hypervisor allocates, to a virtual disk in a virtual machine, an amount of access to at least one physical disk (302). In one embodiment, the hypervisor 101 allocates an amount of access during instantiation of a virtual machine. In another embodiment, the hypervisor 101 retrieves an identification of an amount of access to allocate and allocates access during initialization of the virtual machine; for example, a configuration file or virtual machine image may specify a value for the amount of access to allocate.

The hypervisor determines that a level of utilization of the at least one physical disk exceeds a threshold (304). In one embodiment, the hypervisor 101 determines that a capacity limit of the at least one physical disk 228 has been reached. In another embodiment, the hypervisor 101 determines that a rate of disk access by the virtual machine has exceeded a predetermined threshold. In still another embodiment, the hypervisor 101 determines that an error has occurred on the physical disk. In yet another embodiment, the hypervisor 101 receives an error message from the physical disk 228 indicating that a threshold has been exceeded.

In one embodiment, the hypervisor 101 determines that the virtual disk 142 has exceeded the allocated amount of access to the physical disk 228. In another embodiment, the hypervisor 101 determines that a second virtual machine 106b executing on the computing device 100 has exceeded an allocated amount of access to the physical disk 228. In still another embodiment, the hypervisor 101 determines that a process—such as an application, operating system, or virtual machine—executing on a second computing device 100b and having an allocated amount of access to the physical disk 228 on the computing device 100 has exceed an allocated amount of access to the physical disk 228.

In one embodiment, the hypervisor 101 makes the determination that the threshold has been exceeded responsive to receiving an error message from the physical disk 228. In another embodiment, the hypervisor 101 applies a rule to an error message from the physical disk 228 to determine whether the threshold has been exceeded. In still another embodiment, the hypervisor 101 receives, from the control operating system 105 an indication that the threshold has been exceeded.

In some embodiments, a monitoring agent executing within the control operating system 105 transmits, to the physical disk 228, a request, either directly or via the hypervisor 101, to provide a status of the physical disk 228. In one of these embodiments, the monitoring agent receives an identification of status from the physical disk 228; for example, the physical disk 228 may transmit to the monitoring agent an identification of an amount of unused disk space available on the physical disk 228. In another of these embodiments, the monitoring agent applies a rule to determine whether the status of the physical disk 228 exceeds a threshold. In still another of these embodiments, the monitoring agent transmits, to the hypervisor 101, a determination that the threshold has been exceeded. In yet another of these embodiments, the monitoring agent transmits, to the hypervisor 101, an identification of a method for limiting access by the virtual disk 142 to the physical disk 228.

In some embodiments, the hypervisor 101 masks, from the virtual machine 250, an error on the physical disk 228. In one of these embodiments, the error indicates that a threshold has been exceeded or that a capacity limit on the physical disk 228 has been reached. In another of these embodiments, the error includes a hardware failure on the physical disk 228. In still another of these embodiments, the error includes a time-out error reporting a failure to provide a response to a request within a time period. In yet another of these embodiments, the error is a result of an improper configuration, such as an improper permission setting.

The hypervisor limits, in response to the determination, access by the virtual disk to the at least one physical disk (306). In one embodiment, the hypervisor 101 rate-limits the Input/Output (I/O) operations requested by the virtual disk 142. In another embodiment, the hypervisor 101 suspends the virtual machine 250 to a disk, such as the physical disk 228 or a physical disk 228b on a second computing device 100. In still another embodiment, the hypervisor 101 temporarily terminates an execution of the virtual machine 250 (which may be referred to as "pausing" the virtual machine 250). In still even another embodiment, the hypervisor 101 suspends execution of at least one process by the virtual machine 250. In yet another embodiment, the hypervisor 101 decreases a rate of execution of the virtual machine 250. In some embodiments, the hypervisor 101 limits access by the virtual disk 142 to the physical disk 228, responsive to an instruction from the control operating system 105.

In some embodiments, the hypervisor 101 applies a policy to determine whether and how to limit access by the virtual machine to the physical disk. In other embodiments, the hypervisor 101 accesses a configuration file to determine whether and how to limit access by the virtual machine to the physical disk 228. In one of these embodiments, for example, the hypervisor 101 accesses a file identifying an amount of allocated access, defining the threshold, and specifying an action to take to limit the access. In another of these embodiments, the hypervisor 101 accesses a file containing a mapping between a threshold and a type of limitation to impose. By way of example, and without limitation, the hypervisor 101 may access a file containing a mapping such as the following:

| Amount Allocated | Threshold | Action |
| --- | --- | --- |
| 2 GB of storage allocated | Total free space <=1% free space available on the physical disk | Terminate execution of virtual machine |
| 2 GB of storage allocated | Total free space <=2.5% free space available on the physical disk | Rate-limit I/O requests from virtual disk to physical disk |
| 2 GB of storage allocated | All individual requests serviced within 15 seconds | Rate-limit execution of the virtual machine via time dilation |
| 2 GB of storage allocated | Total free space <=5% free space available on the physical disk | Temporarily stop execution of at least one process by virtual machine ("pause") |

In the example above, if the hypervisor 101 determines that there is less than 1% of a total amount of space available on the physical disk 228, the hypervisor limits the access of the virtual disk 142 to the physical disk 228 by terminating execution of the virtual machine. In this example, if the hypervisor 101 determines that there is less than 2.5% of a total amount of space available on the physical disk 228, the hypervisor limits the access of the virtual disk 142 to the physical disk 228 by rate-limiting input/output requests from the virtual disk 142 to the physical disk 228. In the example above, if the hypervisor 101 determines that the physical disk 228 requires more than 15 seconds to respond to an individual request, the hypervisor limits the access of the virtual disk 142 to the physical disk 228 by rate-limiting an execution of the virtual machine; for example, via time dilation. In the example above, if the hypervisor 101 determines that there is less than 5% of a total amount of space available on the physical disk 228, the hypervisor limits the access of the virtual disk 142 to the physical disk 228 by temporarily stopping execution of at least one process by virtual machine; for example, the hypervisor 101 may direct the virtual machine 250 to save a state of execution of a process and of data accessed by the process and pause the execution of the process. The thresholds and actions described above are by way of example only, as the hypervisor 101 may apply different thresholds or limitations than those described above; additionally, an administrator may configure either the thresholds or the actions differently than those described above.

In one embodiment, the methods and systems described above allow a hypervisor to determine that an error has occurred on the physical disk and to flexibly manage the execution of a virtual machine to mask the error from the virtual machine. In another embodiment, and by way of example, a hypervisor may determine, based on a type of error that has occurred, that the virtual machine may continue to execute if it suspends a subset of processes that it executes, while determining, in the event of a second type of error, that the virtual machine may continue to execute if the hypervisor rate-limits the input/output operations of the virtual machine. In still another embodiment, by determining that a threshold has been exceeded on the physical disk and identifying one of a plurality of methods for limiting access by the virtual disk to the physical disk, the methods and systems described herein provide improved functionality for controlling access to physical resources.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for controlling, by a hypervisor, access to physical resources, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for controlling access to a physical resource, the method comprising:
   identifying, by a monitoring agent for a hypervisor, a status of a physical disk utilized by a virtual disk;
   selecting, by the monitoring agent, an action based on the identified status, the action selected from a plurality of predefined actions for controlling access to the physical disk, wherein the selected action allows for continued access to the physical disk by the virtual disk and wherein the selected action includes reducing active usage of the virtual disk by a virtual machine by one of: rate-limiting execution of the virtual machine or pausing execution of a process executed by the virtual machine; and
   performing, by the hypervisor, the selected action to limit access by the virtual disk of the physical disk.

2. The method of claim 1, wherein the predefined actions are defined in a data file.

3. The method of claim 1, comprising allocating to the virtual disk an amount of access to the physical disk.

4. The method of claim 1, wherein the hypervisor executes on a mobile device.

5. The method of claim 1, wherein the physical disk is one of a plurality of physical disks utilized by the virtual disk.

6. The method of claim 1, wherein the status is one of: that a capacity limit has been reached, that a rate of disk access has exceeded a threshold, and that an error has occurred.

7. The method of claim 1, wherein the status is that an error has occurred and at least one action in the plurality of predefined actions is to mask the error.

8. A system for controlling-access to a physical resource, the system comprising:
   a physical computing device executing a hypervisor that manages access to physical resources of the physical computing device;
   a monitoring agent for the hypervisor, the monitoring agent configured to identify a status of a physical disk utilized by a virtual disk and to select an action based on the identified status, the action selected from a plurality of predefined actions for controlling access to the physical disk, wherein the selected action allows for continued access to the physical disk by the virtual disk and wherein the selected action includes reducing active usage of the virtual disk by a virtual machine by one of: rate-limiting execution of the virtual machine or pausing execution of a process executed by the virtual machine; and
   the hypervisor configured to perform the selected action to limit access by the virtual disk to the physical disk.

9. The system of claim 8, wherein the predefined actions are defined in a data file.

10. The system of claim 8, wherein the hypervisor is configured to allocate to the virtual disk an amount of access to the physical disk.

11. The system of claim 8, wherein the physical disk is one of a plurality of physical disks utilized by the virtual disk.

12. The system of claim 8, wherein the status is one of: that a capacity limit has been reached, that a rate of disk access has exceeded a threshold, and that an error has occurred.

13. The system of claim 8, wherein the status is that an error has occurred and at least one action in the plurality of predefined actions is to mask the error.

14. The system of claim 8, wherein the hypervisor executes on a mobile device.

15. The method of claim 1, wherein the selected action includes rate-limiting input/output (I/O) requests from the virtual disk to the physical disk.

16. The method of claim 1, wherein the selected action includes
   causing time dilation of the virtual machine.

17. The system of claim 8, wherein the selected action includes rate-limiting input/output (I/O) requests from the virtual disk to the physical disk.

18. The system of claim 8, wherein the selected action includes
   causing time dilation of the virtual machine.

* * * * *